Patented Jan. 30, 1923.

1,443,458

UNITED STATES PATENT OFFICE.

WILLIAM JOHN BRUCE, OF NEW YORK, N. Y.

FOOD PRODUCT AND METHOD OF MANUFACTURING.

No Drawing. Application filed April 11, 1921. Serial No. 460,455.

*To all whom it may concern:*

Be it known that I, WILLIAM J. BRUCE, residing at New York city, in the county of New York and State of New York, have invented a certain new and useful Food Product and Method of Manufacturing, of which the following is a specification.

It is an object of my invention to provide a new and useful composition of matter of the nature of milk fermented by the *Bacillus Bulgaricus* type A designed or adapted for use as a food and therapeutic product, having various advantages over anything of this sort previously on the market.

It is a further object to provide a new and improved method or process for manufacturing such product.

It is a further object of my invention to provide a new and useful composition of matter designed and intended as a food and therapeutic product and at the same time serve as a laxative, and to provide a new and improved method or process for producing such product.

Referring to the invention in detail I produce the product first above referred to as follows:

The first step in the process or method is to pasteurize a new raw milk. This pasteurization is carried out in large steam or water jacketed vats or by any other suitable means. The milk is filtered through a strainer consisting of several ply of gauze lined with sterile absorbent cotton into a vat which is referred to as vat number one. It is then heated to a temperature of 65 degrees centigrade and held at that temperature for fifteen minutes. The milk is then run into vat number two which is preferably placed at a lower elevation than vat number one, in which second vat the material is again held for fifteen minutes at a temperature of sixty-five degrees centigrade. Running the milk from vat number one to vat number two produces a thorough mixing and the milk is given the pasteurized treatment of thirty minutes at sixty-five degrees centigrade. After this treatment the pasteurized milk is then run off into sterile twenty liter glass bottles containing small pieces of sterilized calcium carbonate approximately three pounds. The bottle and contents are then placed in cold storage and brought down to a temperature below eight degrees centigrade. When desired the milk is removed from the cold storage room to an inoculating room and a fresh twenty-four hour culture of *Bacillus Bulgaricus* of the desired quantity, preferably approximately five hundred cubic centimeters to each twenty liter bottles is added. The bottles are then shaken and placed for the purpose of further accentuating the growth of these germs in an incubator for about ten hours at a temperature of approximately forty degrees centigrade. Thereupon they are placed in cold storage and brought down to a temperature below eight degrees centigrade in order to inhibit further growth of this organism and to preserve its virility in which condition it is kept until ready for bottling for the trade. As the *Bacillus Bulgaricus* type A produces a large amount of lactic acid when grown in milk, approximately three per cent, it has been found that this excess acid will not only inhibit the growth, reduce virility, but will actually cause a decomposition of the germs, and as it is necessary to produce a product of several millions of organisms per cubic centimeter, in a high virile form, the addition of calcium carbonate has been found to neutralize the excess acidity, yet leaving a sufficient amount present for the chemical action in vitro.

The remaining lactic acid cannot be harmful as this acid enjoys a universal recognition of great medicinal value. The strain of *Bacillus Bulgaricus* used is a subculture of the one isolated by Grigoroff, known as the only true *Bacillus Bulgaricus*, and classified as type A. It is recognized both for its ability to produce acid and high virility. Since the therapeutic value of this organism is to inhibit putrefaction, it will accomplish this through its ability to reproduce in great numbers in the transverse colon, producing an acid medium which completely inhibits the virility of the pathogenic intestinal flora. The product for the trade is preferably put up in eight ounce dark brown or green glass bottles to protect the product against the deleterious effect of the light rays. This describes the method of process for manufacturing the first product.

As to the second product, the method or process is the same, except that I add immediately before bottling eight grams of phenolphtalein at eight degrees centigrade to each twenty liter bottle for single strength or sixteen grams for double strength. The addition of the phenolphtalein does not in any wise detract from the composition as a food product and at the same time renders it a laxative. After the phenolphtalein has been added the bottle is shaken or rolled, in order to produce a thorough mixture. The composition is then passed through a sterile gauze strainer into the bottling machinery. The product is then bottled, labelled, again placed in a temperature below eight degrees centigrade and held at that temperature until marketed.

Having thus described my invention, I claim:

1. The herein described composition of matter consisting of pasteurized milk, calcium carbonate and a fresh liquid milk culture of *Bacillus Bulgaricus* substantially as described.

2. The herein described composition of matter consisting of pure whole milk pasteurized, a fresh culture of *Bacillus Bulgaricus* and calcium carbonate substantially as described.

3. In the method of producing the herein described composition of matter consisting of adding to pure whole milk pasteurized, calcium carbonate, then reducing the temperature, then adding to the mixture thus formed a culture of *Bacillus Bulgaricus*, then incubating the mixture, then reducing the temperature thereof.

In witness whereof, I hereunto subscribe my name to this specification in the presence of two witnesses.

WILLIAM JOHN BRUCE.

Witnesses:
JOHN HEALEY,
PETER HUGHES.